United States Patent [19]

Bedegrew et al.

[11] Patent Number: 5,750,915
[45] Date of Patent: May 12, 1998

[54] LAUNCH MOUNT PEDESTAL AND UMBILICAL MAST

[75] Inventors: Ernest R. Bedegrew, Santa Cruz; Robert J. MacDonald, San Jose; Louis E. Rustenburg, Sunnyvale; Russell E. Godfrey, San Jose; Daniel H. Hada; Raymond L. Fredrickson, both of Cupertino; Larry V. Digdigan, Union City; David A. Niemann, Santa Clara; Russell K. Chun, San Francisco, all of Calif.

[73] Assignee: Lockheed Martin Corporation, Bethesda, Md.

[21] Appl. No.: 565,753

[22] Filed: Dec. 1, 1995

[51] Int. Cl.⁶ .............................. F41F 3/04; B64G 1/00; F16M 13/00
[52] U.S. Cl. .................. 89/1.8; 102/358; 244/158 R; 248/519
[58] Field of Search ........................ 89/1.8, 1.816, 89/1.819; 102/348, 349, 343, 358; 244/158 R, 63; 446/52; 60/915; 248/519, 521

[56] References Cited

U.S. PATENT DOCUMENTS

| | | | |
|---|---|---|---|
| 234,132 | 11/1880 | Kyser et al. | 102/358 |
| 2,095,490 | 10/1937 | Decker | 102/358 |
| 2,307,125 | 1/1943 | Goddard | 60/915 |
| 2,617,617 | 11/1952 | Krastel et al. | 248/519 |
| 3,029,704 | 4/1962 | Truax | 89/1.816 |
| 3,228,294 | 1/1966 | Hickman | 89/1.8 |
| 3,242,811 | 3/1966 | Swet | 89/1.819 |
| 3,280,744 | 10/1966 | Brown | 102/358 |
| 3,312,017 | 4/1967 | Witherspoon et al. | 89/1.8 |
| 3,363,508 | 1/1968 | Stahmer | 244/63 |
| 4,569,151 | 2/1986 | Hoffbeck | 248/519 |
| 4,582,287 | 4/1986 | DeLeary | 248/519 |
| 5,294,078 | 3/1994 | Gurr | 244/158 R |
| 5,529,264 | 6/1996 | Bedegrew et al. | 244/158 R |
| 5,531,419 | 7/1996 | Gustafsson et al. | 248/519 |

*Primary Examiner*—Michael J. Carone
*Assistant Examiner*—Theresa M. Wesson
*Attorney, Agent, or Firm*—Holme Roberts & Owen

[57] ABSTRACT

A launch vehicle pedestal and an umbilical mast in which the pedestal includes a launch mount pedestal and four pedestal adapters. The launch mount pedestal includes a launch vehicle support base having an exhaust opening. Four legs extend downwardly from the support base and pedestal connecting means are secured to lower ends of each of the legs. The four pedestal adapters serve to secure the legs to existing launch vehicle support posts, the pedestal adapters each having adapter connecting means complementarily engageable with the pedestal connecting means. The umbilical mast comprises a plurality of round cylindrical segments connected by means of connectors at their ends. The connectors comprise radially extending flanges with circumferential holes in them. The mast further includes an access door and at least one opening in at least one of the segments for electrical cables and an air conditioning duct.

19 Claims, 15 Drawing Sheets

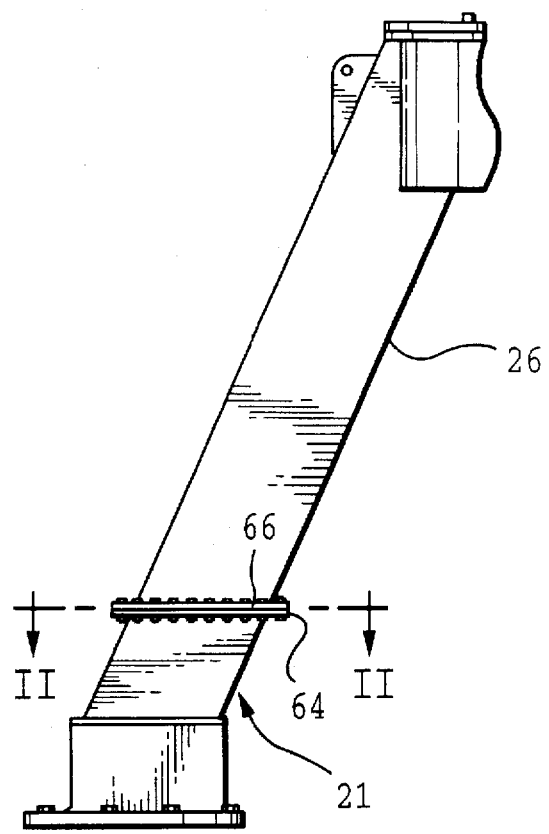
FIG.10
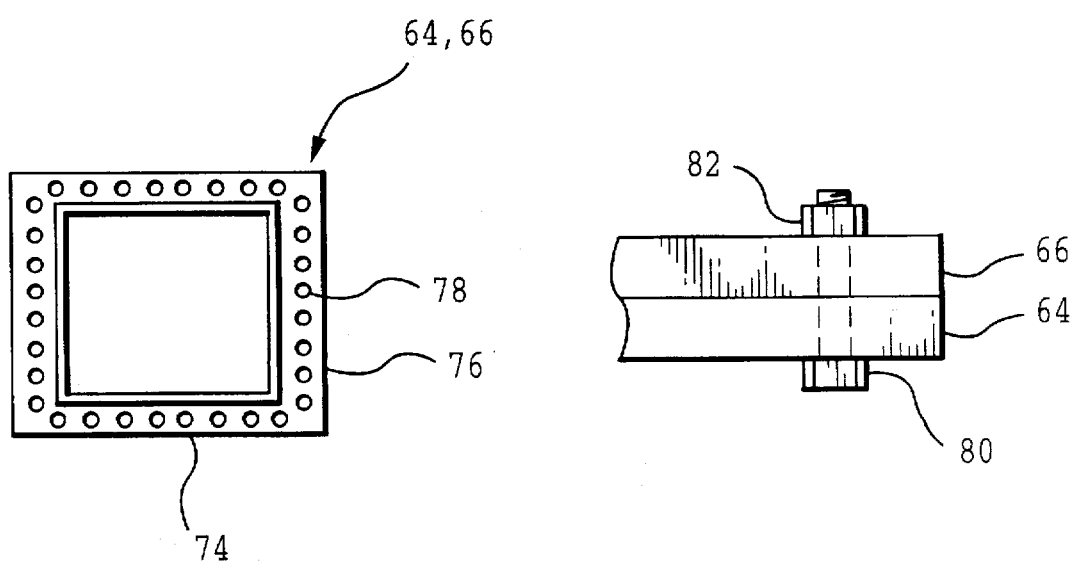
FIG.11
FIG.12

LAUNCH MOUNT PEDESTAL AND UMBILICAL MAST

FIELD OF THE INVENTION

This invention relates to a launch mount pedestal and an umbilical mast for a launch vehicle.

BACKGROUND OF THE INVENTION

It is well known that launch vehicles are typically mounted on support stands or platforms or other suitable structures which serve to support the launch vehicle at a suitable firing angle. In the majority of launch vehicles this firing angle will be 90° to the horizontal. In order to support the weight of the launch vehicle, its fuel and the payload and to withstand the forces and temperatures to which the support structure is exposed when the launch vehicle is launched, a large number of parameters have to be taken into account. Many prior art launch pedestals ensure that the proper launch angle is maintained by providing vertically extending support structures which support the sides of the launch vehicle. In some cases the launch vehicles are furthermore bolted to their launch platform by means of explosive or shearing bolts. Typically launch vehicle mount pedestals known in the art are designed in conjunction with a platform for a specific launch vehicle. As such they form a unitary structure with the launch platform and are inseparably secured thereto. Since they are typically designed to handle a specific vehicle and are permanently mounted they are unsuitable for handling a variety of vehicles. This also applies to peripheral structures forming part of the launch platform structure. In particular, umbilicals designed for a space shuttle would be unsuitable for servicing LLV1's, LLV2's and LLV3's as described in commonly assigned, U.S. Pat. No. 5,529,264, entitled "Launch Vehicle System". Accordingly it would be desirable to provide an umbilical which can be adjustable in length. Furthermore it would be desirable to provide a removable launch mount pedestal adapted to be secured to existing structures, and an umbilical which is made up of separable segments thereby facilitating transportation and assembly of the umbilical mast.

OBJECTS AND SUMMARY OF THE INVENTION

It is an object of the invention to provide a launch mount pedestal which can be readily secured to existing support posts or used in conjunction with existing above ground or below ground launch ducts. For this purpose it is an object of the invention to provide a launch mount pedestal having suitable interfaces allowing it to be used with existing structures.

It is a further object of the invention to provide a launch mount pedestal having a horizontal launch vehicle support base, the launch mount pedestal having means for adjusting the attitude of the support base to ensure perpendicularity of a launch vehicle mounted on the base.

It is yet a further object of the invention to provide a launch mount pedestal which dispenses with the need for securing bolts to secure the launch vehicle to the pedestal, and which eliminates the need for lateral support structures to maintain perpendicularity of the launch vehicle.

It is a further object of the invention to provide an umbilical mast which has a modular structure.

According to the invention there is provided a launch vehicle pedestal which includes a launch mount pedestal comprising a launch vehicle support base having an exhaust opening, with four legs extending downwardly from the support base. Pedestal connecting means are secured to lower ends of each of the legs, and four pedestal adapters are provided for securing the legs to existing launch vehicle support posts, the pedestal adapters each having adapter connecting means complementarily engageable with the pedestal connecting means.

The pedestal connecting means typically comprise a pedestal connector plate welded to the lower end of each leg, each plate defining a flange with holes in it for receiving connecting bolts passed through the holes. Each adapter connecting means can comprise an adapter connector plate having holes defined therein which are aligned with the holes in the pedestal connector plate for complementarily receiving the connecting bolts.

Each pedestal adapter can include a vertically extending first, cylindrical section, having a circular cross-section, and a second section, having a rectangular cross-section, secured at an angle to an upper end of the first section.

Each leg can comprise a tubular member having a rectangular cross-section, secured at its upper end to the support base and connected at its lower end to the second section of the pedestal adapter so as to extend co-axially with the second section of the pedestal adapter. The second sections of the pedestal adapters and the co-axially extending legs can be angled inwardly towards each other at a slope of 133 vertical displacement to 55$^{23}$/$_{64}$ horizontal displacement.

The support base can include guide plates for correctly positioning a launch vehicle relative to the exhaust opening.

The launch vehicle pedestal typically includes a sacrificial plate secured to an upper surface of the support base.

The launch vehicle pedestal can further include lifting lugs secured to the legs for lifting the launch vehicle pedestal.

Further, according to the invention there is provided a launch mount pedestal comprising a substantially annular support base having an exhaust opening and four legs extending outwardly and downwardly from the base, wherein the legs have a rectangular cross-section.

The legs can be angled at a slope of 133 vertical displacement to 55$^{23}$/$_{64}$ horizontal displacement.

The launch mount pedestal can include guide formations for correctly positioning a launch vehicle relative to the exhaust opening.

The launch mount pedestal typically includes a sacrificial plate secured to an upper surface of the support base.

The launch mount pedestal can further include lifting lugs secured to the legs for lifting the launch mount pedestal.

Still further according to the invention there is provided an umbilical mast for a launch vehicle comprising a plurality of cylindrical segments having connecting means at their ends for connecting the segments to one another. An access door is provided in at least one of the segments, and at least one opening is provided in at least one of the segments for extending electrical cables and an air conditioning duct through the opening. Each connecting means comprises a radially extending flange having a plurality of circumferentially spaced holes in it for receiving connecting bolts.

Each connecting means can include radially extending vertical webs secured to the cylindrical segment and to the flange for supporting the flange.

BRIEF DESCRIPTION OF THE DRAWINGS

FIG. 10 is a side view of one of the legs of the launch mount pedestal and a pedestal adapter;

FIG. 11 is a sectional plan view taken along the line II—II of FIG. 10;

FIG. 12 shows a detailed side view of the connection between a pedestal leg and a pedestal adapter;

DETAILED DESCRIPTION OF THE INVENTION

Figure 1:
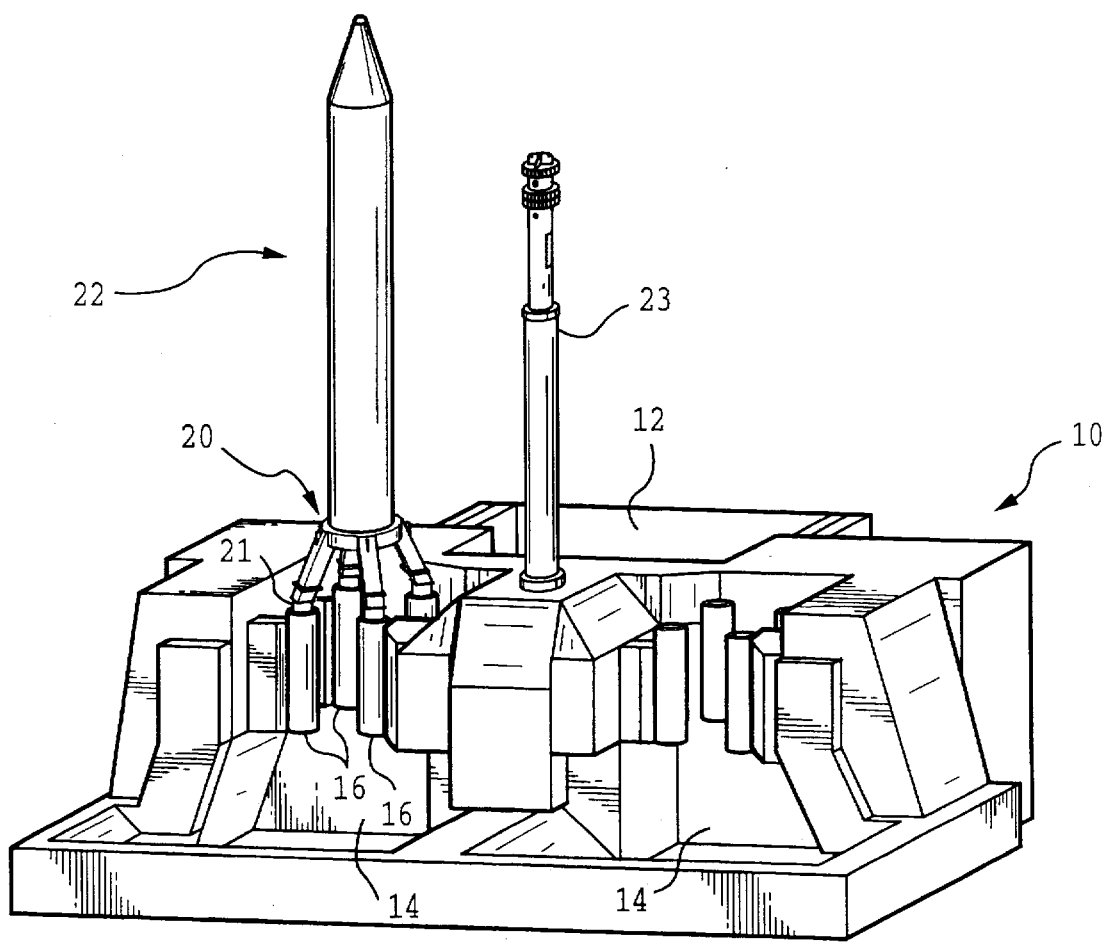
FIG. 1 is a three dimensional view of a space shuttle launch platform showing a launch mount pedestal in accordance with the invention mounted on one of the solid rocket booster hold down posts.

FIG. 1 illustrates a space shuttle launch platform 10 which includes a shuttle engine duct 12 for the exhaust gases from the main engine. It further includes two ducts 14 for the solid rocket boosters. Each solid rocket booster duct 14 includes four hold down posts 16 which are designed to support a space shuttle solid rocket booster motor. The drawing illustrates a launch mount pedestal 20 of the invention mounted on the hold down posts 16 by means of pedestal adapters 21. A launch vehicle 22 which in this illustration comprises a LLV1 as described in co-pending U.S. patent application Ser. No. 08/511,170 entitled "Payload Assembly" is supported by the launch mount pedestal 20.

FIG. 1 further illustrates an umbilical mast 23 providing electrical connections and air conditioning to the launch vehicle prior to the launch.

Figure 2:
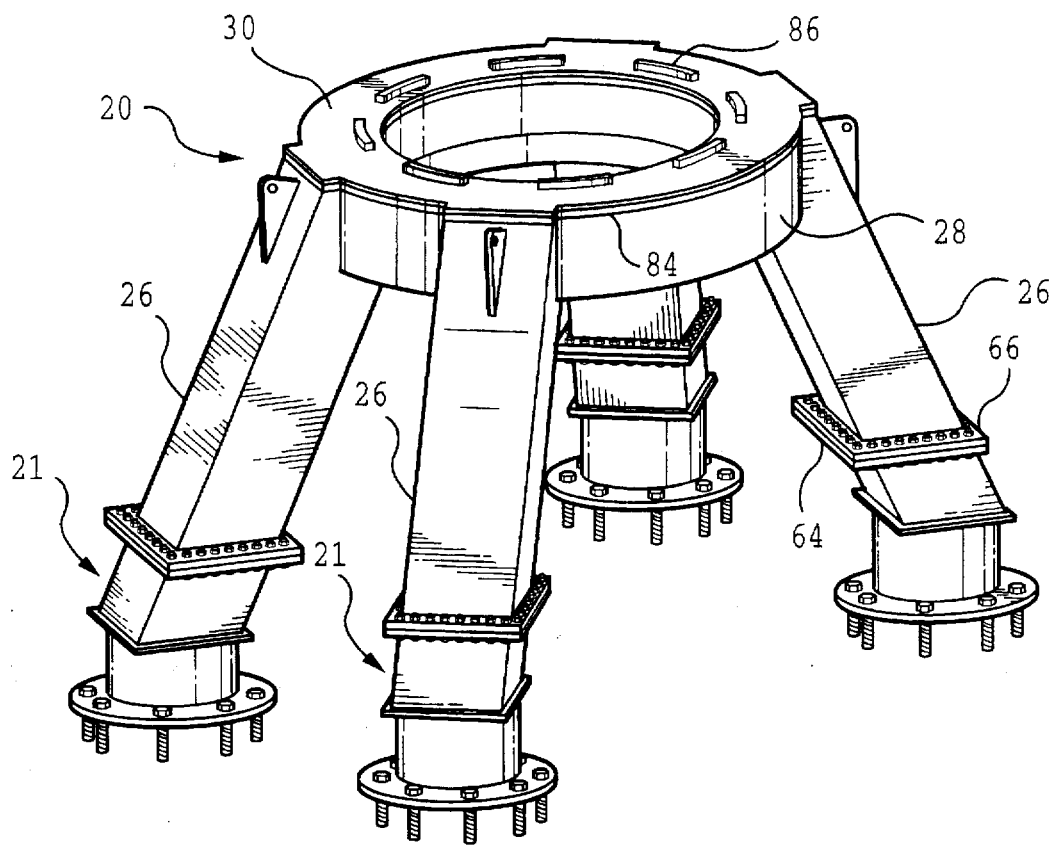
FIG. 2 is an isometric view of a launch mount pedestal in accordance with the invention.
Figure 3:
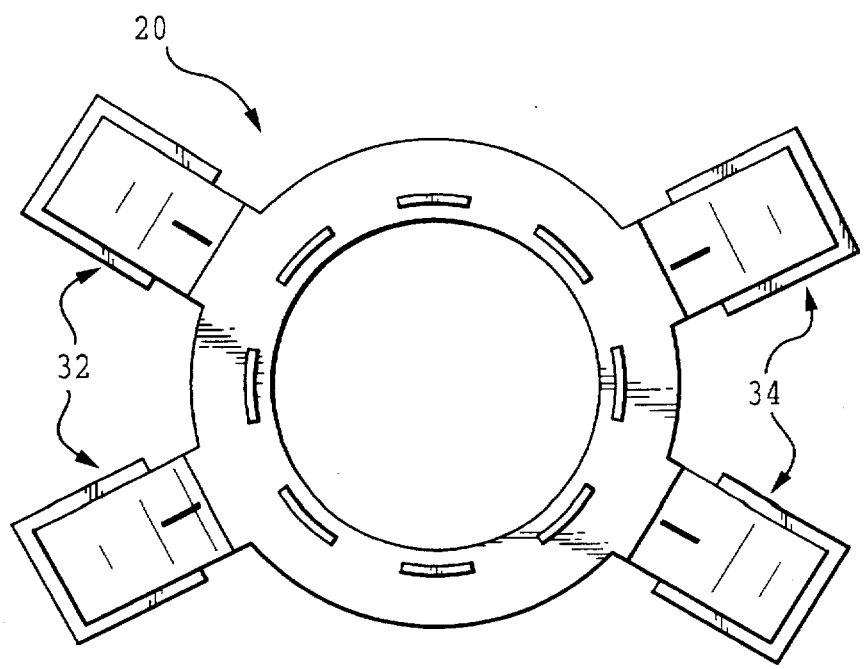
FIG. 3 is a plan view of the launch mount pedestal of FIG. 2.
Figure 4:
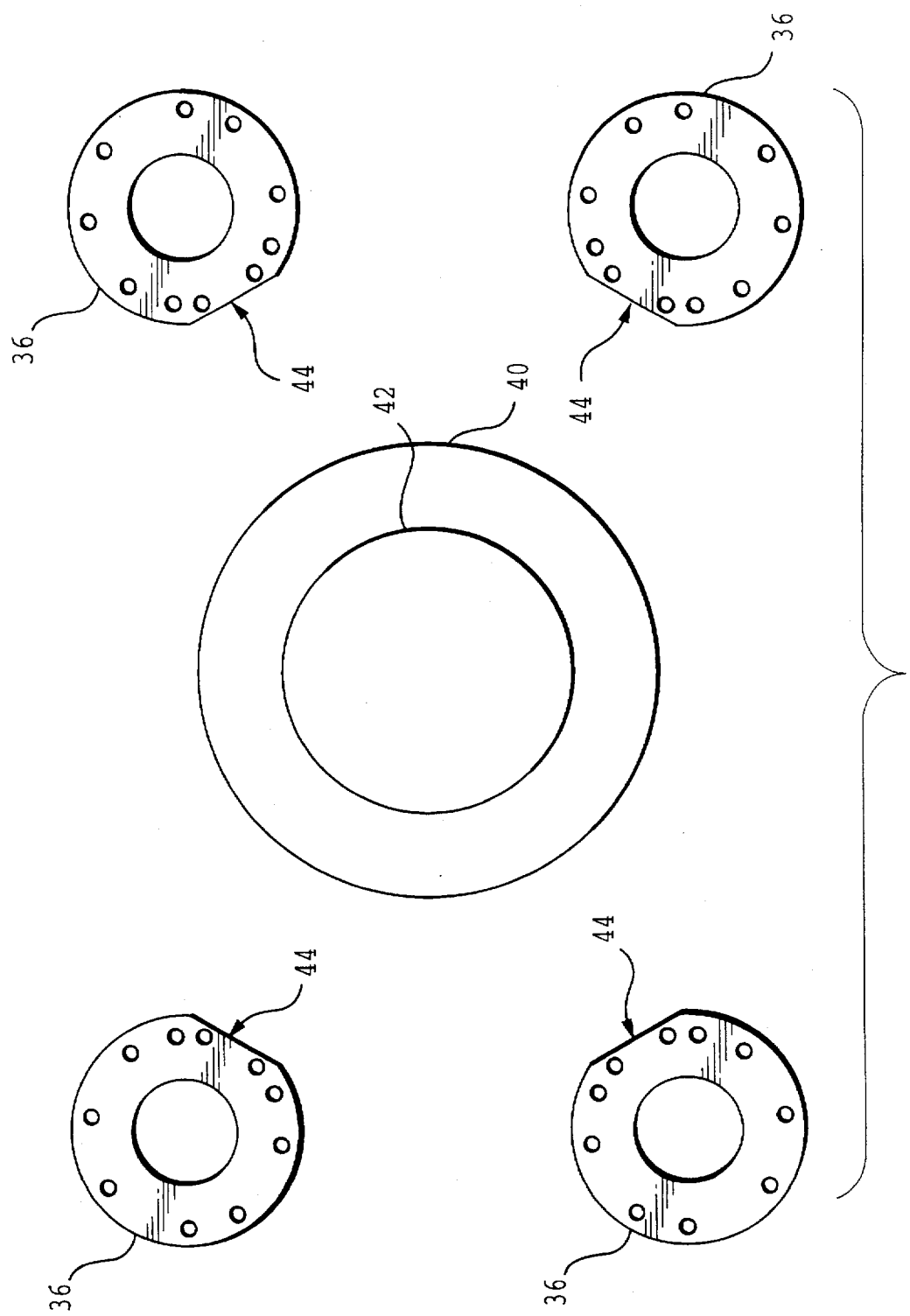
FIG. 4 is a schematic representation of the position of a launch vehicle relative to existing solid rocket booster hold down post base plates.

FIG. 2 is an isometric view of the launch mount pedestal 20 and of a set of four pedestal adapters 21. The launch mount pedestal 20 includes four legs 26, each of which is secured to a pedestal adapter 21. The legs 26 are connected at their other ends to a pedestal box ring girder 28 which supports a sacrificial plate 30. The launch mount pedestal 20 is illustrated in plan view in FIG. 3 which, in this embodiment, shows the circumferential spacing between the pair of legs 32 and between the pair of legs 34 each being 60°. In contrast the spacing between adjacent legs 32, 34 is 120°. This configuration is designed to conform to the spacing of existing space shuttle solid rocket booster hold down posts 16. FIG. 4 is a schematic representation of existing solid rocket booster hold down post base plates 36 relative to the position of a launch vehicle 40 with its nozzle 42.

Figure 5:
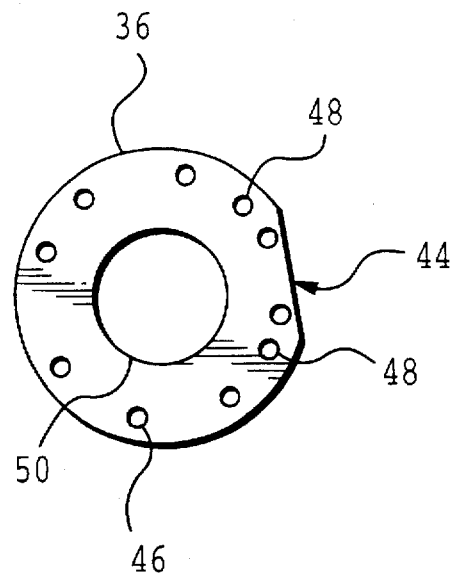
FIG. 5 is a schematic representation of an existing solid rocket booster hold down post base plate.

The existing solid rocket booster hold down post base plates 36 are more clearly illustrated in FIG. 5 which shows a plan view in schematic form of an existing base plate. The base plate 36 is substantially circular in shape having a straight edge 44 which faces inwardly as illustrated in FIG. 4. The base plate 36 is provided with eight, 3.5 inch diameter holes. The holes 46 are spaced circumferentially on the plate and at 45° intervals. The holes 48 closest to the straight edge 44 are spaced 75° from each other and 30° from their respective adjacent outer holes. Two, 3 inch diameter holes are provided in the plate on the circumferential line spaced 20° on either side of the perpendicular bisector of the straight edge 44. The plate 36 includes a central opening 50 having a radius of 11 inches.

Figure 6:
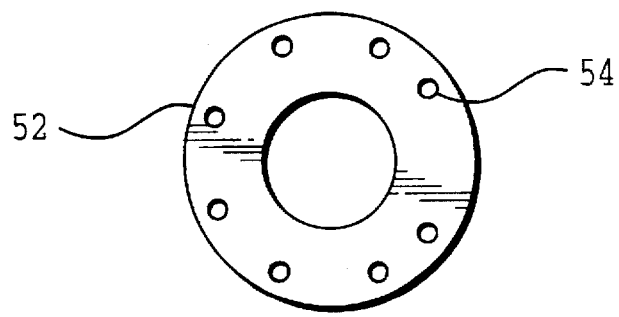
FIG. 6 is a plan view of a pedestal base plate for use with the launch mount pedestal.

FIG. 6 is a plan view of a pedestal base plate 52 which is adapted to fit onto the existing base plate 36. The plate 52 has a diameter and inner opening corresponding to that of the base plate 36. A set of 8 holes are provided in the base plate 52 spaced circumferentially to correspond to the holes 46 in the base plate 36.

Figure 7:
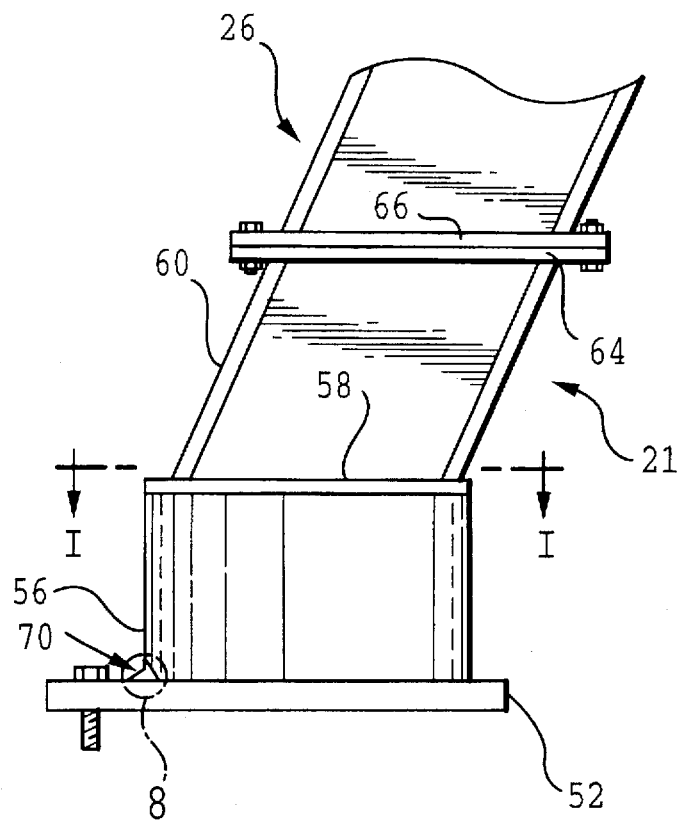
FIG. 7 is a side view of a pedestal adapter and part of a pedestal leg of the launch mount pedestal of FIG. 2.
Figure 8:
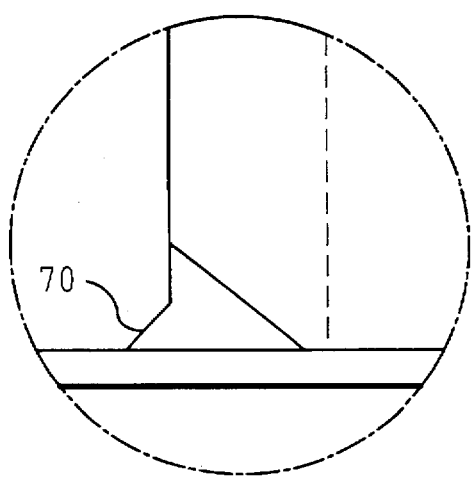
FIG. 8 is a detail view of part of the pedestal adapter.

FIG. 7 shows a side view of a pedestal adapter 21 which includes the base plate 52. The adapter 21 includes a cylindrical portion 56 having a circular cross-section, extending perpendicularly relative to the plate 52. The cylindrical portion 56 comprises a pipe having a circular cross section. The cylinder 56 is terminated at its upper end by a support plate 58. A second section 60 in the form of a tube having a square cross-section is secured to the plate 58 and extends upwardly at an angle to the vertical. The section 60 is terminated by a horizontally extending square connector plate 64. The plate 64 is bolted to a corresponding plate 66 forming the lower end of the pedestal 20. The connection between the plates 64, 66 will be described in greater detail below. The foot of the circular cylinder 56 is secured to the plate 52 by means of a weld joint. For greater support the foot of the cylinder 56 is provided with a radially extending bevelled flange 70 shown in greater detail in FIG. 8.

Figure 9:
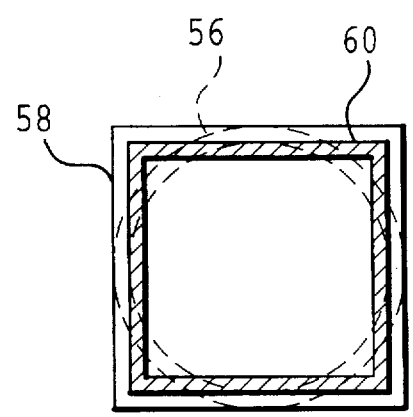
FIG. 9 is a sectional plan view of the pedestal adapter of FIG. 7 taken along the line I—I.

FIG. 9 shows a cross section along the line I—I in FIG. 7. It shows the support plate 58 which has a square shape. Mounted on this is the section 60. Beneath the plate is the round cylinder 56.

A pedestal leg 26 extends upwardly at an angle as illustrated in FIG. 10 and is secured at its upper end to the pedestal box ring girder which will be discussed in greater detail below. The leg 26 is angled such that, in this embodiment, it has a slope of 133 inches vertically: $55^{23}/_{64}$ inches horizontally. Like the various sections of the pedestal adapter 21, the legs 26 are made of steel in this embodiment. As mentioned with respect to FIG. 7 and as illustrated in FIG. 2 the legs 26 are connected to the pedestal adapters 21 by means of complementary connector plates 64, 66. The plates 64 and 66 are identical in every respect, one of the plates being shown in greater detail in FIG. 11. The plates 64, 66 are not entirely square having a long side 74 inches and a short side 76. 32 holes 78 are spaced around the periphery of the plates 64, 66. Each plate 64 is welded to a square tubular section 60. Each plate 66 is welded to the lower end of a leg 26. The legs 26 are secured to the pedestal adapters 21 by means of bolts 80 as illustrated in FIG. 12. The bolts 80 are passed through the aligned holes 78 and secured by means of nuts 82. It will be appreciated that due to the angle of the leg 26, the bolts 80 have to be passed from the bottom upwardly on the inner side of the leg 26 and from the top downwardly on the outer side of the leg 26.

Figure 13:
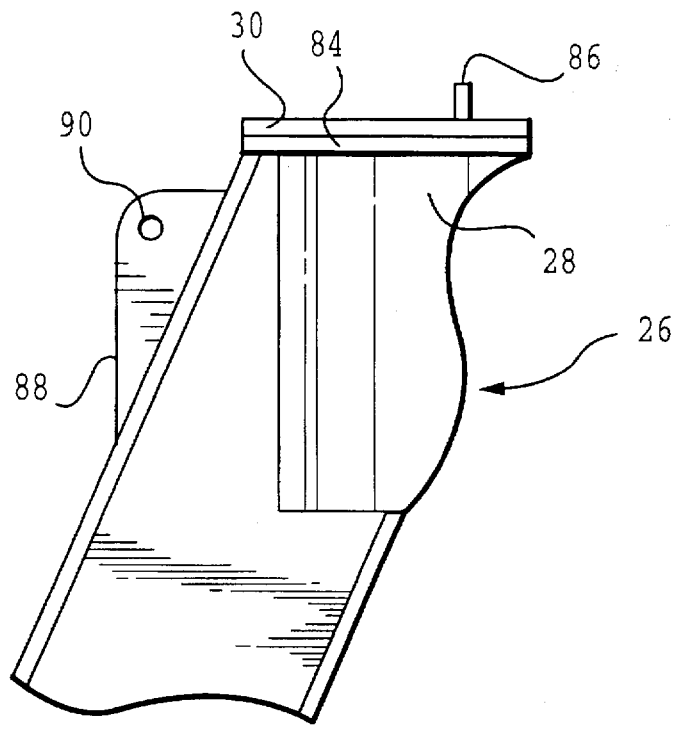
FIG. 13 is a side view of the upper portion of a pedestal leg.

FIG. 13 illustrates a side view of the upper part of a leg 26. It includes a cut-away section to accommodate the pedestal box ring girder 28. The girder 28 includes an upper support plate 84 which in turns supports the sacrificial plate 30. Extending upwardly from the plate 84 are guide formations which, in this embodiment take the form of plates 86 (shown more clearly in FIG. 2) which serve to properly align the launch vehicle when it is placed on the sacrificial plate 30. The upper part of the leg 26 further includes a lifting lug 88 which defines a lifting hole 90. The lifting hole 90 allows a pin to be secured to the leg in order to permit the leg 26 to be lifted by means of a crane or other suitable lifting implement.

Figure 15:
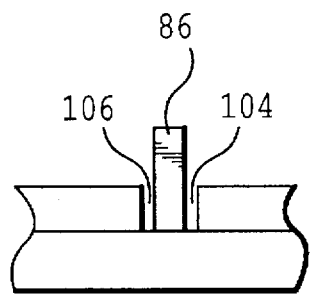
FIG. 15 is a detailed sectional side view of a portion of the sacrificial plate of FIG. 14.
Figure 14:
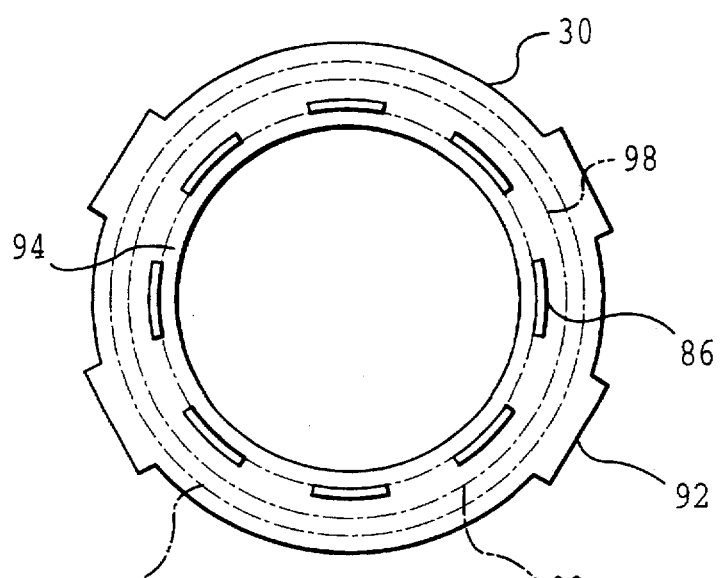
FIG. 14 is a plan view of a sacrificial plate forming part of the pedestal of FIG. 2.

FIG. 14 illustrates the annular sacrificial plate 30 in plan view. In addition, it includes outwardly extending ears 92 corresponding to the shape of the plate 84 as illustrated in FIG. 2 in order to accommodate the radially extending portions of the upper parts of the legs 26. The plates 86 defines an inner ring 94. Except for the inner ring 94, the sacrificial plate is covered with an ablative coating. The sacrificial plate 30 is secured to the plate 84 by means of 24 stainless steel countersunk screws spaced along two circumferential lines 98, 100. FIG. 14 also illustrates the guide plates 86 of which 8 are evenly spaced along a circumferentially extending line. The guide plates 86 are illustrated in cross section in FIG. 15. The plate 86 is provided with an inner air gap 104 and an outer gap 106. The gaps serve to accommodate thermal expansion.

Figure 16:
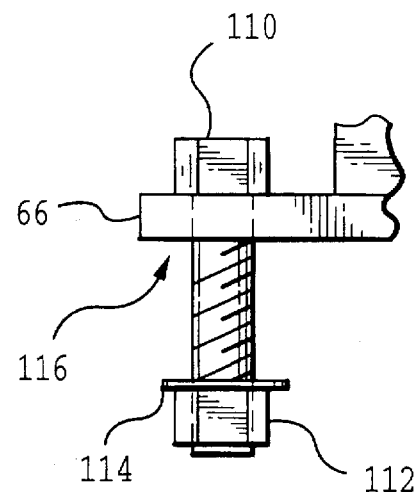
FIG. 16 is a detailed side view of the connecting means between the existing solid rocket booster hold down post base plates and the pedestal base plates.

As mentioned above the launch mount pedestal 20 is secured to four pedestal adapters 21 by means of bolts as illustrated in FIG. 2. Since the launch vehicle placed on the pedestal 20 is not secured in any way to the pedestal it is essential that the platform support surface as defined by the sacrificial plate 30 is absolutely horizontal. This is achieved by means of shims placed under the pedestal base plates 52. Referring to FIG. 16, the connector plate 66 is connected to the connector plate 64 (not shown in FIG. 16) by means of bolts 110 passed through the aligned holes 78 (FIG. 11) and secured by means of heavy hex nuts 112 and hardened washers 114. One inch maximum shims (not shown) are placed between the plates 64, 66 at the location marked by reference numeral 116.

The top and bottom surfaces of the sacrificial plate 30 and the top surface of the plate 84 are machined such that when the sacrificial plate 30 is attached to the girder 28 the top surface of the sacrificial plate shall be within $\frac{1}{64}$ inch in the uncoated area 94. One inch maximum shims may also be provided between the solid rocket booster motor hold down post base plates 36 and the pedestal base plates 52.

Figure 17:
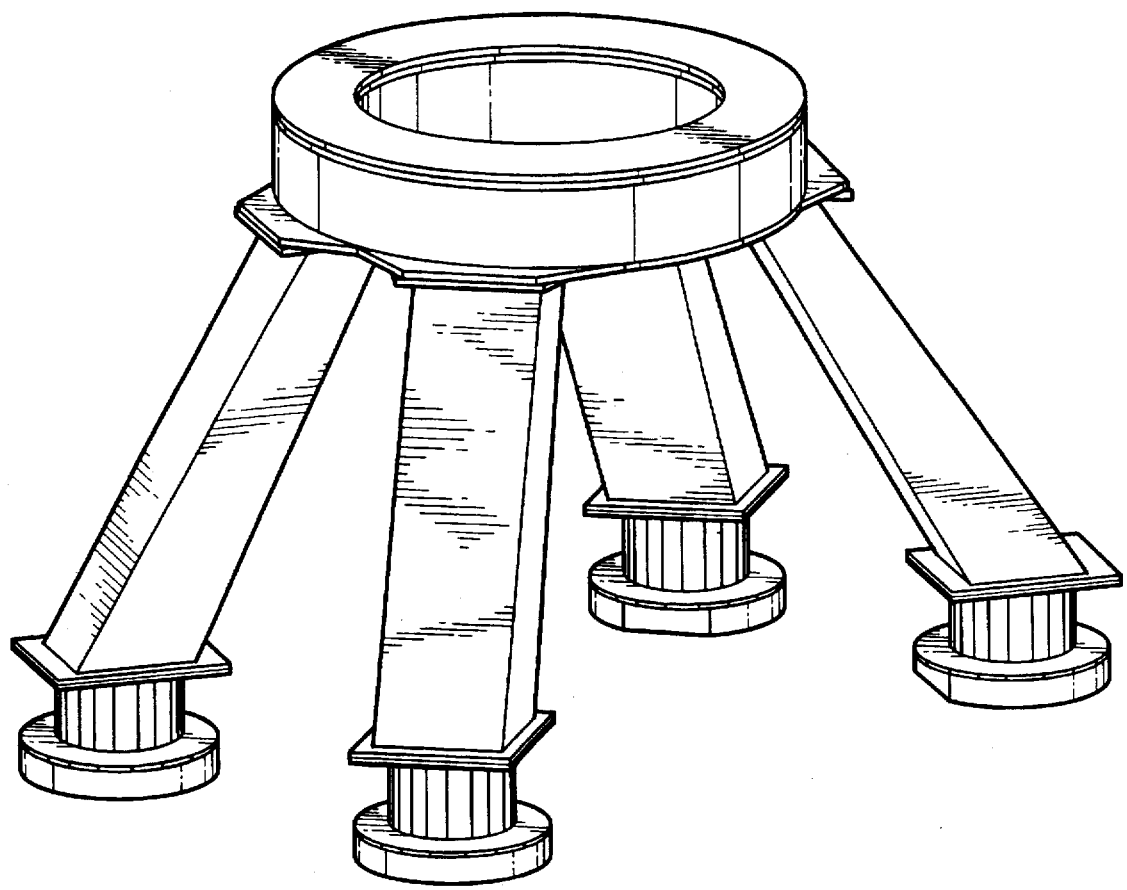
FIG. 17 is an isometric representation of a further embodiment of a launch mount pedestal in accordance with the invention.

It will be appreciated that the embodiment of the launch mount pedestal 20 and pedestal adapter 21 described above is merely one possible configuration. Other pedestals and adapters could be provided having similar characteristics and strength parameters. One such embodiment is illustrated in FIG. 17.

Figures 18, 19, 20:
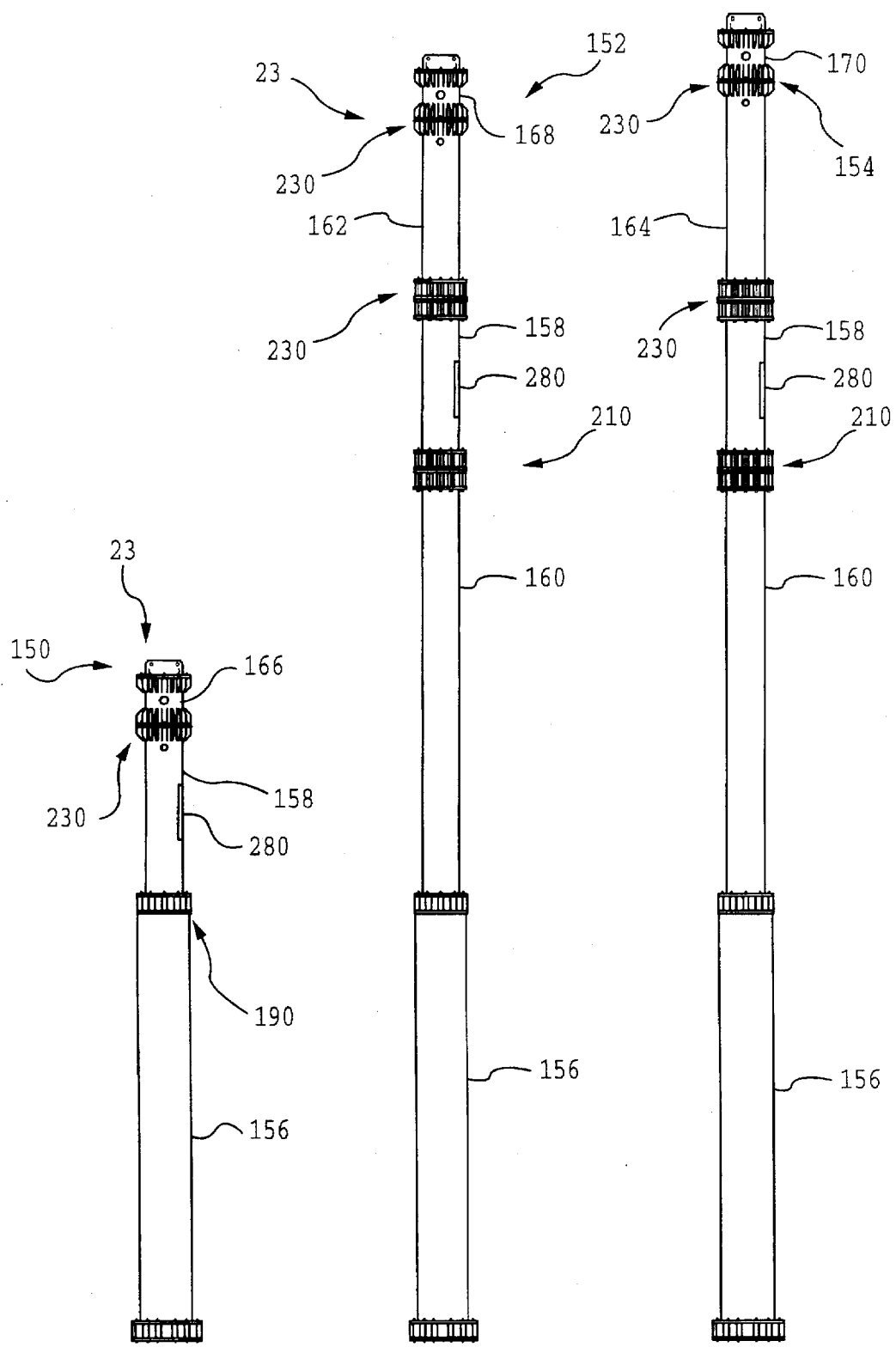
FIG. 18 is a side view of an umbilical mast in accordance with the invention for an LLV1.
FIG. 19 is a schematic side view of an umbilical mast for an LLV2.
FIG. 20 is a schematic side view of an umbilical mast for an LLV3.

Referring to FIGS. 18 to 20, the umbilical mast 23 will now be described in greater detail. FIG. 18 shows the configuration of the umbilical mast for an LLV1 and is indicated generally by reference numeral 150. FIG. 19 illustrates an umbilical mast 152 for an LLV2 and FIG. 20 shows an umbilical mast 154 for an LLV3.

The umbilical masts 23 are made up of interconnectable segments. The umbilical masts 150, 152 and 154 each have similar bottom segments 156 and tops segments 158. The umbilical masts 152 and 154 further include middle segments 160. In addition, the umbilical mast 156 has an extender segment 162, and the umbilical mast 154 has an extender segment 164. A termination segment forms the upper termination of each umbilical mast and is indicated by reference numerals 166, 168 and 170 for the mast 150, 152 and 154 respectively.

The bottom segment 156 for each of the umbilical mast comprises a circular cylinder. The top segments 158 comprise circular cylinders having steel walls that are typically thinner than those of the bottom segments.

The middle segments 160 for the umbilical masts 152, 154 comprise circular cylinders having steel walls that are typically thicker than those of the bottom segments.

Figure 21:
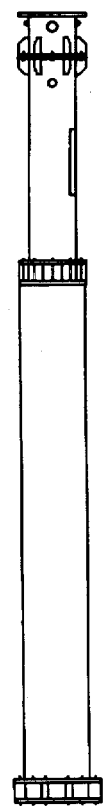
FIG. 21 is a side view of another embodiment of an umbilical mast in accordance with the invention for an LLV1.
Figure 22:
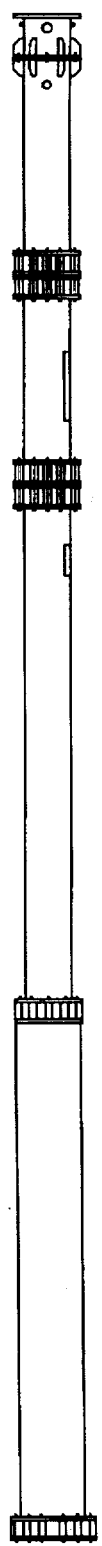
FIG. 22 is a partially schematic side view of another embodiment of an umbilical mast for an LLV2.
Figure 23:
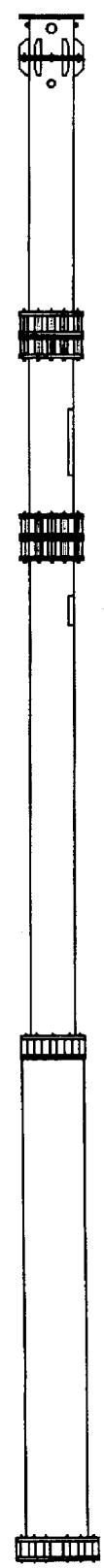
FIG. 23 is a schematic side view of another embodiment of an umbilical mast for an LLV3.

The extender 162 for the mast 152 and the extender 164 of the mast 154 comprise circular cylinders having a steel wall. The extenders 162, 164 differ in their length and have dimensions designed to accommodate the differences in height of the launch vehicle to be serviced. Another embodiment of each of the masts 23 is shown in FIGS. 21, 22 and 23 for an LLV1 and LLV2 and LLV3, respectively. The mast illustrated in FIGS. 21 to 23 differ in the upper part of their termination segments insofar as they do not include lifting lugs which will be described in greater detail below.

Figure 24:
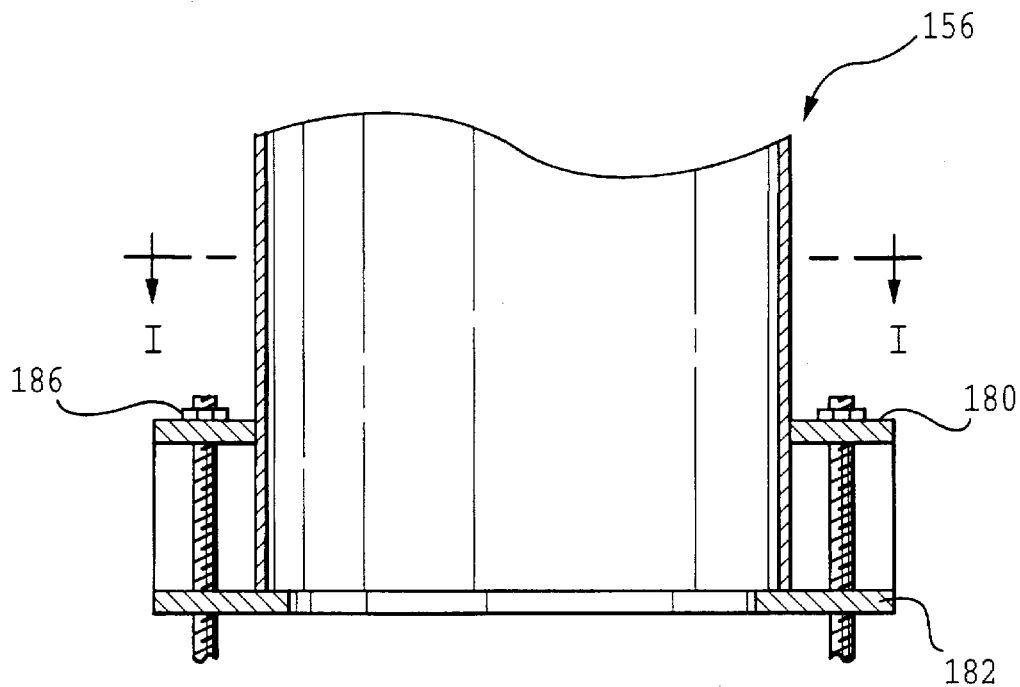
FIG. 24 is a sectional side view of a lower connector secured to a lower end of a bottom segment of an umbilical mast.
Figure 25:
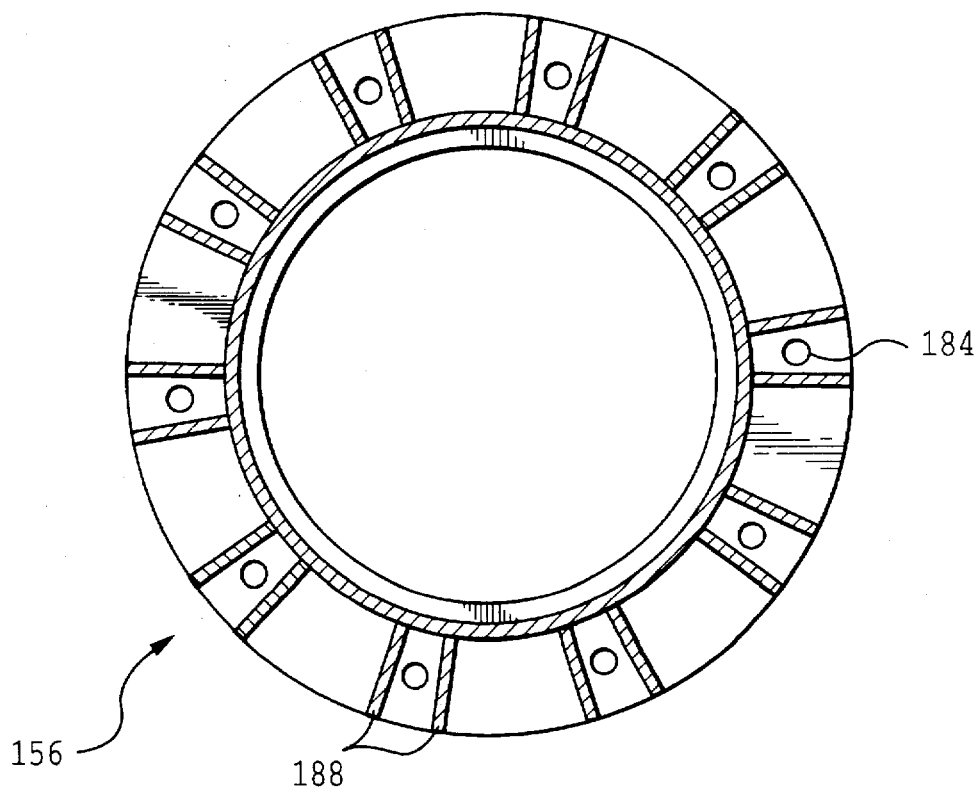
FIG. 25 is a sectional plan view of the connector illustrated in FIG. 24 along the line I—I.

The bottom segment 156 will now be described in greater detail with reference to FIGS. 24 and 25. FIG. 24 is a sectional side view of the segment 156 and FIG. 25 is a sectional plan view of the segment 156 along the line I—I in FIG. 24. FIG. 24 shows an outwardly extending circumferential flange 180 and an annular plate 182. The plate 182 defines an annular outwardly extending flange. The flange 180 and plate 182 are spaced apart and serve as attachment formations for securing the mast 23 to a support platform (not shown). A plurality of holes 184 are spaced circumferentially on the flange 180. The holes 184, which are evenly spaced 36° apart, are aligned with corresponding holes in the flange of the plate 182 to receive bolts 186 (FIG. 24) passed through the aligned holes. As is shown in FIG. 25, the flange 180 and plate 182 are supported by means of radially extending webs 188 located on either side of each of the holes 184.

Figure 26:
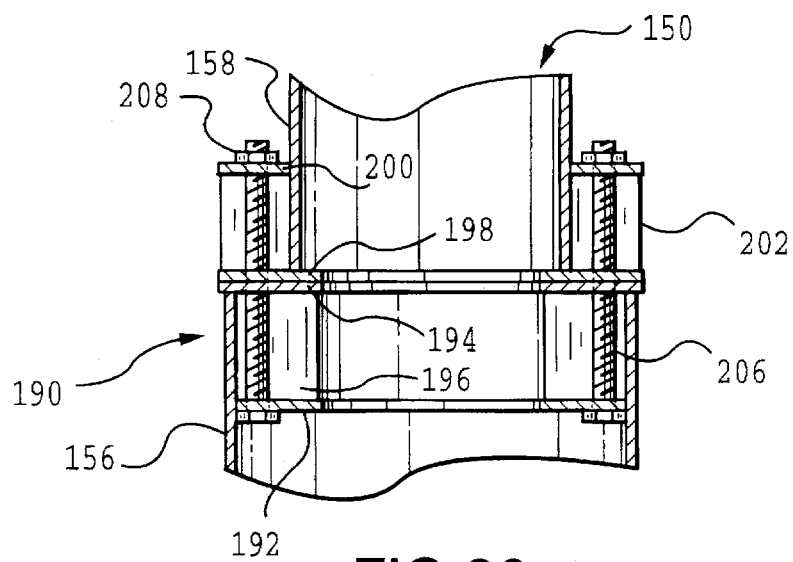
FIG. 26 is a sectional side view of a connector between a bottom segment and a top segment of an LLV1 umbilical mast in accordance with the invention.

The next connection considered is that between the bottom segment 156 and a top segment 158 for an LLV1 umbilical mast 150. In the case of an LLV2 and LLV3 umbilical a similar connector is provided between the bottom segment 156 and the middle segment 160. For ease of explanation the connector which will be indicated generally by reference numeral 190 will be described with reference to an LLV1 umbilical 150. Referring to FIG. 26, the connector 190 is shown from the side in cross section. The bottom segment 156 is provided with an inwardly extending circumferential flange 192 and an upper annular termination plate 194 defining a radially inwardly extending flange. The flange 192 and plate 194 are spaced apart and are supported by means of radially extending vertical webs 196. The top segment 158 has a lower annular plate 198 similar to the plate 194, which abuts the plate 194. It also has an upper circumferential outwardly extending flange 200. The plate 198 and flange 200 are spaced apart and are supported by means of radially outwardly extending vertical webs 202. The flanges 202 and 192, and the plates 194 and 198 are provided with circumferentially spaced aligned holes spaced 45° apart for receiving vertically extending bolts 206. The bolts 206 connect the top segment 158 to the bottom segment 156, being secured by means of nuts 208. The webs 196, 202 are located on either side of each of the holes.

Figure 27:
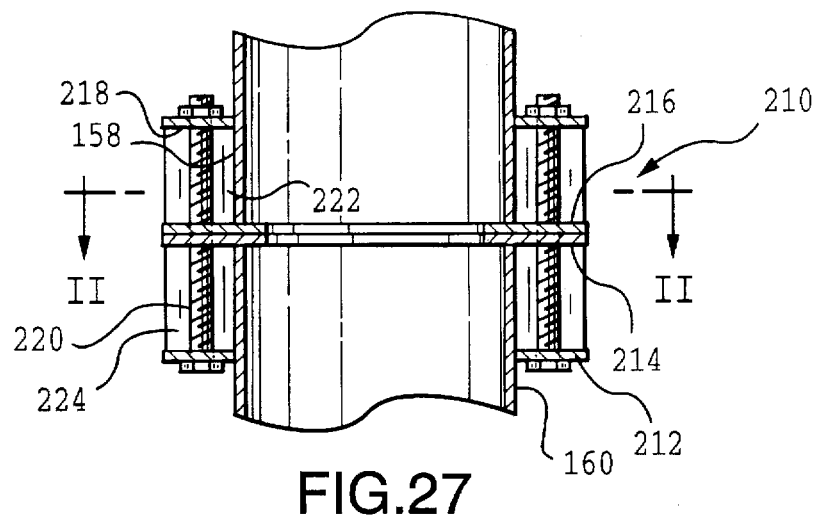
FIG. 27 is a sectional side view of a connector between a middle segment and a top segment of an LLV2 or LLV3.
Figure 28:
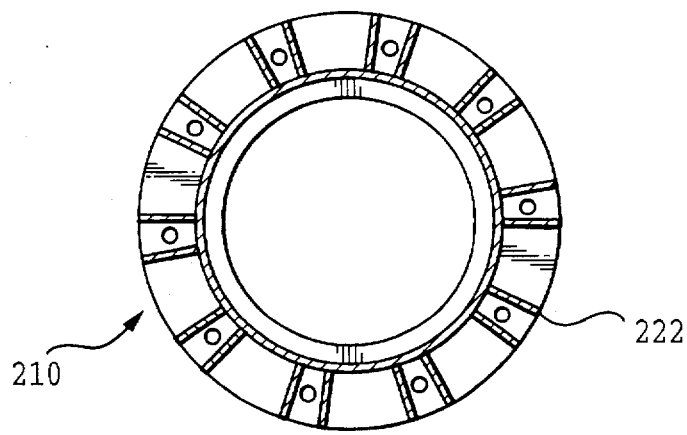
FIG. 28 is a sectional plan view of the connector illustrated in FIG. 27 along the line II—II.

In the case of the LLV2 and LLV3 umbilicals illustrated in FIGS. 19 and 20, the upper end of the middle segment 160 is connected to the lower end of the top segment 158. The connector is indicated generally by reference numeral 210 and is illustrated in FIGS. 27 and 28. FIG. 27 is a sectional side view of the connector 210, and FIG. 28 is a sectional plan view of the connector 210 taken along the line II—II in FIG. 27. In this connector the upper part of the middle segment 160 includes an outwardly extending circumferential flange 212 and an upper annular plate 214 spaced 1 foot from the flange 212 and defining an outwardly extending flange. Similarly the top segment 158 includes a lower annular termination plate 216 defining an outwardly extending circumferential flange. The top segment 158 also includes a radially outwardly extending circumferential flange 218 spaced from the flange 216. Circumferentially spaced aligned holes are provided in the plates 214, 216 and in the flanges 212, 218. The aligned holes receive vertically extending bolts 220 which secure the middle segment 160 to the top segment 158. The holes are spaced 45° apart and lie on a circumferentially extending line. Radially extending vertical webs 222 are provided on either side of each hole intermediate the flange 218 and the plate 216. Similarly webs 224 are provided between the plate 214 and the flange 212. The webs 222 and 224 flare radially outwardly.

Figure 29:
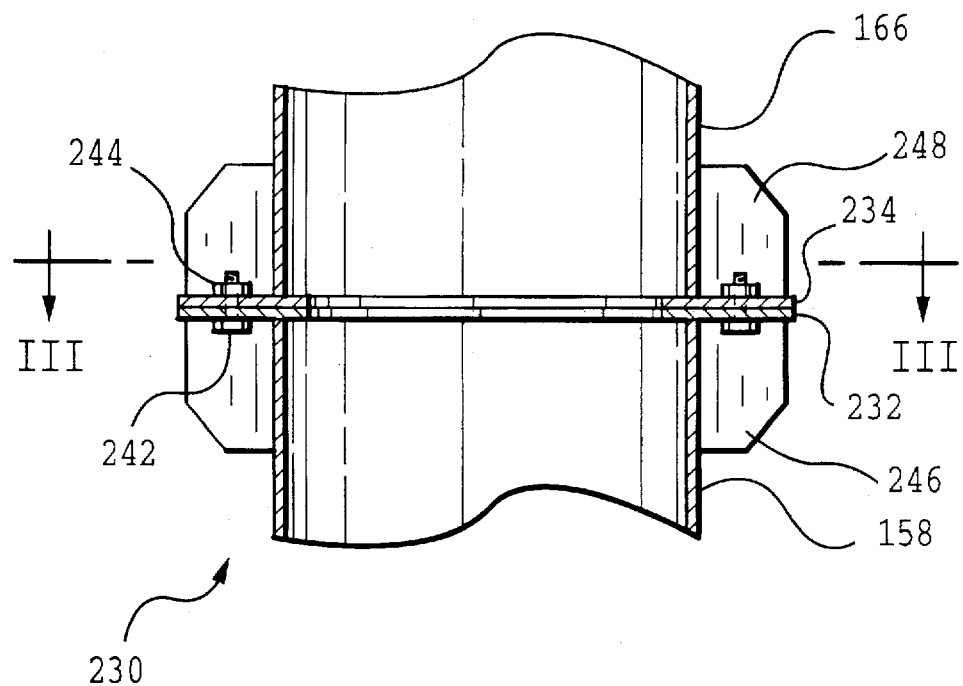
FIG. 29 is a sectional side view of a connector between a top segment and a termination segment of an LLV1.
Figure 30:
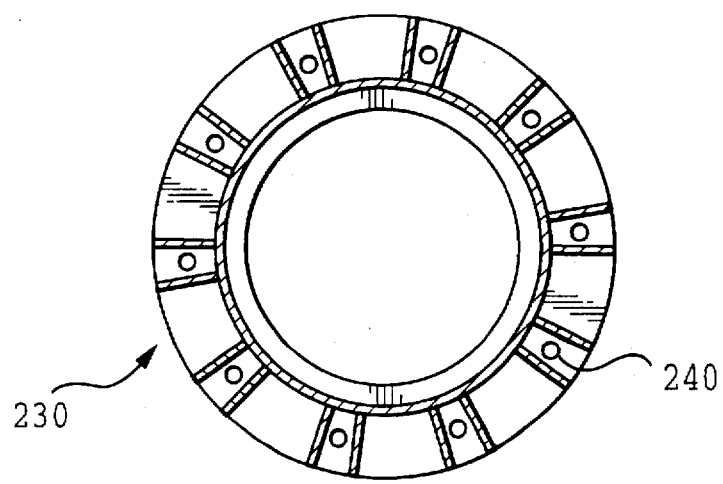
FIG. 30 is a sectional plan view of the connector illustrated in FIG. 29 along the line III—III.
Figure 31:
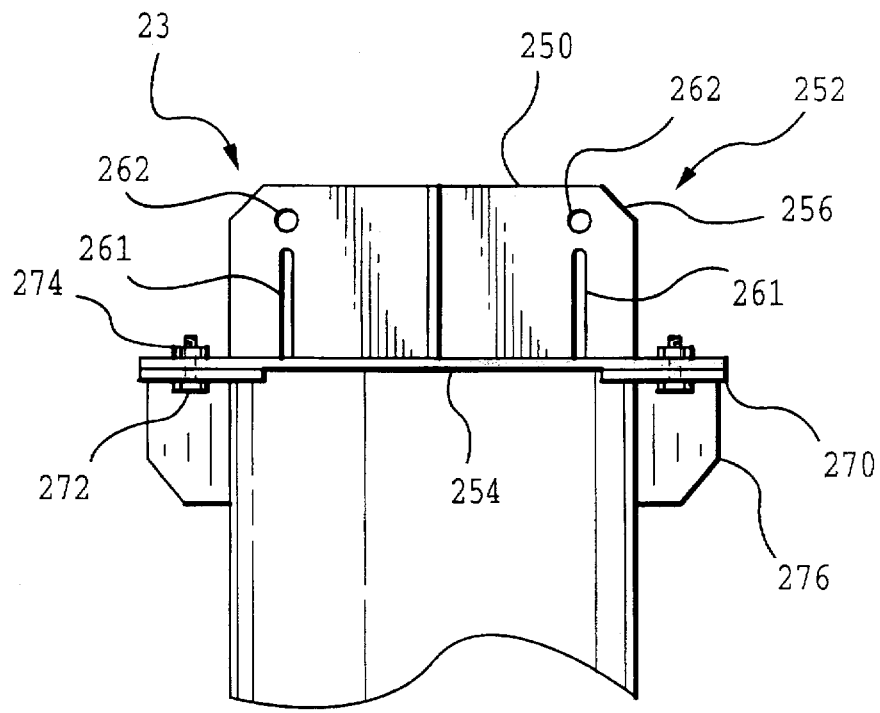
FIG. 31 is a sectional front view of a lifting lug connector for use with an umbilical mast in accordance with the invention.
Figure 32:
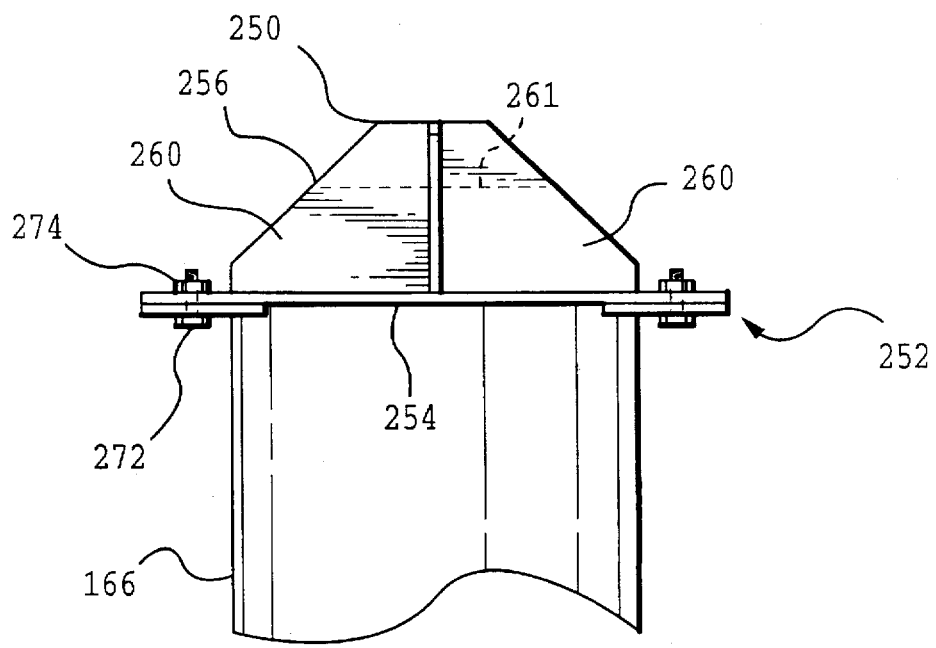
FIG. 32 is a sectional side view of the connector illustrated in FIG. 31.

Referring again to FIG. 18 a connector 230 is provided between the top segment 158 and the termination segment 166. Similar connectors are provided for the FIGS. 19 and 20 embodiments between their respective upper segments 158 and their extenders 162, 164. The FIGS. 19 and 20 embodiments further include a similar connector 230 between the extenders 162, 164 and their respective termination segments 168, 170. The connector 230 is illustrated in greater detail in FIGS. 29 and 30. FIG. 29 is a sectional side view of the connector 230 while FIG. 30 is a sectional plan view of the connector 230 taken along the line III—III in FIG. 29. The connector 230 will be described with reference to the embodiment illustrated in FIG. 18. The top segment 158 and the termination segment 166 are each provided with annular plates at their opposed ends. The plate secured to the upper end of the top segment 158 is indicated by reference numeral 232. The plate secured to the lower end of the termination segment 166 is indicated by reference numeral 234. Circumferentially spaced holes 240 extend through the plates 232, 234 as illustrated in FIG. 30. Bolts 242 extend through the holes 240 and are secured by means of nuts 244 as shown in FIG. 29. The holes 240 are spaced 45° apart and lie on a circumferentially extending line. For greater stability the plates 232 are secured by means of radially extending vertical webs 246 located on either side of each hole. Similarly the plates 234 are secured by means of radially extending vertical webs 248. Lifting lugs 250 are secured to each umbilical 150, 152, 154 by means of a connector 252 as illustrated in greater detail in FIGS. 31 and 32. The lifting lug comprises a base plate 254 to which is secured a vertically extending plate 256 and transversely extending primary vertical support plates 260. Transversely extending secondary support plates 261 are provided on either side of each plate 260. The plate 256 is provided with a pair of holes 262 for lifting the umbilical. The plates 260 are provided with vertical portions extending into inwardly angled upper portions. The connector 252 is described with reference to the umbilical 150. The termination segment 166 includes an annular plate 270 which defines an outwardly extending circumferential flange. The plate 270 is provided with circumferentially spaced holes for receiving bolts 272. The base plate 254 is provided with similar aligned holes for receiving the bolts 272. The bolts are, in turn, secured by means of nuts 274. For greater support the plate 270 is supported by means of a pair of opposite vertical webs 276 extending outwardly from the termination segment 166.

Figure 33:
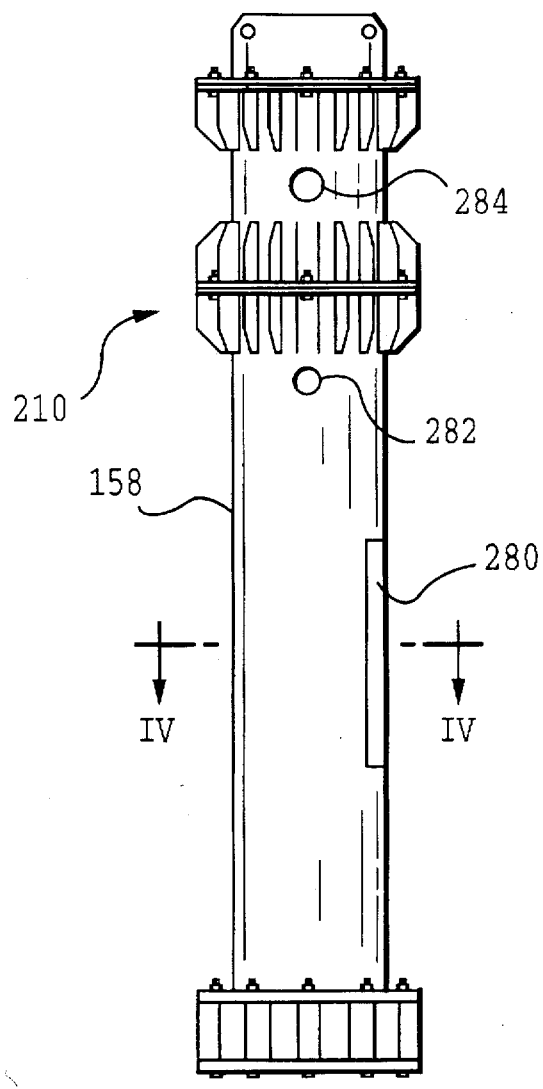
FIG. 33 is a side view of the upper portion of an LLV1 umbilical mast in accordance with the invention.
Figure 34:
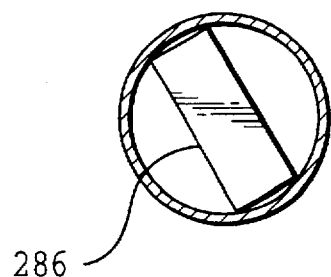
FIG. 34 is a sectional plan view along the line IV—IV of FIG. 33.

Each umbilical 150, 152, 154 is provided with an access door 280 which will be described with reference to the umbilical 150 and is shown in greater detail in FIGS. 33 and 34. Each mast further includes an umbilical opening 282 in the upper end of the top segment 158. An opening 284 for air conditioning is provided in the termination segment of each umbilical. The umbilical openings are spaced 105° from a perpendicular bisector line through the door 280. A junction box 286 is mounted in each umbilical so as to face the access door 280 as shown in FIG. 34.

By using a modular concept for an umbilical mast 23 it is possible to transport the various segments using conventional vehicles and to subsequently erect the mast using conventional cranes. The umbilical mast 23 supports electrical cables and an air conditioning duct (not shown) extending up the mast 23 and through the openings 282, 284 respectively. The electrical cables and air conditioning duct are retractable by means of a mechanism (not shown) mounted externally to the mast.

It will be appreciated that the embodiments described above are merely illustrative examples and are not to be considered in any way limiting.

We claim:

1. A launch mount pedestal for use in an existing launch pad having a plurality of launch vehicle support posts, said launch mount pedestal comprising:

a launch vehicle support base having an exhaust opening;

four legs extending downwardly from the support base;

pedestal connecting means secured to lower ends of each of the legs; and four pedestal adapters for securing the legs to the launch vehicle support posts, the pedestal adapters having adapter connecting means complimentarily engagable with the pedestal connecting means.

2. A launch mount pedestal of claim 1, wherein each pedestal connecting means comprises a pedestal connector plate welded to the lower end of each leg, each plate defining a flange with holes in it for receiving connecting bolts passed through the holes.

3. A launch mount pedestal of claim 2, wherein each adapter connecting means comprises an adapter connector plate having holes defined therein which are aligned with the holes in the pedestal connector plate for complementarily receiving the connecting bolts.

4. A launch mount of claim 3 further including four shims that are inserted between the respective pedestal connector plates and the adapter connector plates.

5. A launch mount pedestal of claim 3, wherein each pedestal adapter includes a vertically extending first, cylindrical section, having a circular cross-section, and a second section, having a rectangular cross-section, secured at an angle to an upper end of the first section.

6. A launch mount pedestal of claim 5, wherein each leg comprises a tubular member having a rectangular cross-section, secured at its upper end to the support base and connected at its lower end to the second section of the pedestal adapter so as to extend co-axially with the second section of the pedestal adapter.

7. A launch mount pedestal of claim 6, wherein the downwardly extending legs and second sections of the pedestal adapters are angled outwardly away from each other at a slope of 133 vertical displacement to $55^{23}/_{64}$ horizontal displacement.

8. A launch mount pedestal of claim 1, wherein the support base includes guide formations for correctly positioning a launch vehicle relative to the exhaust opening.

9. A launch mount pedestal of claim 1 further including a sacrificial plate secured to an upper surface of the support base.

10. A launch mount pedestal of claim 1, wherein at least one of the legs includes a lifting lug secured thereto for lifting of the launch mount pedestal.

11. A launch mount pedestal for use with a plurality of launch vehicle support posts of a launch pad, said launch mount pedestal comprising:

a substantially annular support base having an exhaust opening and a plurality of legs extending outwardly and downwardly from the base; and connecting means interconnectable between lower ends of the legs and launch vehicle support posts, for complimentarily securing the plurality of legs with the launch vehicle support posts.

12. A launch mount pedestal of claim 11 in which the legs are angled at a slope of 133 vertical displacement to $55^{23}/_{64}$ horizontal displacement.

13. A launch mount pedestal of claim 11, wherein the connecting means comprises four pedestal adapters connected to lower ends of the respective legs.

14. A launch mount pedestal of claim 13 further comprising four shims positioned between the respective lower ends of the legs and the pedestal adapters.

15. A launch mount pedestal of claim 11 further comprising guide plates for correctly positioning a launch vehicle relative to the exhaust opening.

16. A launch mount pedestal of claim 11 further comprising a sacrificial plate secured to an upper surface of the support base.

17. A launch mount pedestal of claim 11 further comprising lifting lugs secured to the legs for lifting the launch mount pedestal.

18. A launch mount pedestal of claim 11, wherein the legs have a rectangular cross-section.

19. A launch mount pedestal of claim 11, wherein the connecting means comprises pedestal connecting means secured to lower ends of each of the legs and a plurality of pedestal adapters for securing the legs to the launch vehicle support posts, the pedestal adapters each having adapter connecting means complimentarily engagable with the pedestal connecting means.

* * * * *